(12) United States Patent
Gonzalez

(10) Patent No.: US 10,638,191 B2
(45) Date of Patent: Apr. 28, 2020

(54) EFFICIENT INSERTION OF MEDIA ITEMS IN MEDIA STREAMS

(71) Applicant: Google LLC, Mountain View, CA (US)

(72) Inventor: Jose M. Gonzalez, San Jose, CA (US)

(73) Assignee: Google LLC, Mountain View, CA (US)

(\*) Notice: Subject to any disclaimer, the term of this patent is extended or adjusted under 35 U.S.C. 154(b) by 0 days.

(21) Appl. No.: 16/445,688

(22) Filed: Jun. 19, 2019

(65) Prior Publication Data

US 2019/0364334 A1 Nov. 28, 2019

Related U.S. Application Data

(63) Continuation of application No. 15/630,254, filed on Jun. 22, 2017, now Pat. No. 10,362,356.

(51) Int. Cl.

| | |
|---|---|
| *H04N 21/44* | (2011.01) |
| *H04N 21/433* | (2011.01) |
| *H04N 21/262* | (2011.01) |
| *H04N 21/266* | (2011.01) |
| *H04N 21/462* | (2011.01) |
| *H04N 21/458* | (2011.01) |
| *H04N 21/6405* | (2011.01) |

(Continued)

(52) U.S. Cl.
CPC . *H04N 21/44016* (2013.01); *H04N 21/26241* (2013.01); *H04N 21/26616* (2013.01); *H04N 21/4331* (2013.01); *H04N 21/458* (2013.01); *H04N 21/4622* (2013.01); *H04N 21/6405* (2013.01); *H04N 21/858* (2013.01); *H04N 21/812* (2013.01)

(58) Field of Classification Search
CPC ....... H04N 21/26241; H04N 21/26616; H04N 21/4331; H04N 21/44016; H04N 21/458; H04N 21/4622; H04N 21/6405; H04N 21/812; H04N 21/858

See application file for complete search history.

(56) References Cited

U.S. PATENT DOCUMENTS

| | | |
|---|---|---|
| 5,600,366 A | 2/1997 | Schulman |
| 5,946,646 A | 8/1999 | Schena et al. |

(Continued)

OTHER PUBLICATIONS

'www.monroe-electronics.com' [online] "What are Cue Tones?" Publication Date: Unknown [retrieved on Jun. 22, 2017] Retrieved from Internet: URL<http://www.monroe-electronics.com/CATV_appntspdf/apnt-0024.pdf> 3 pages.

(Continued)

*Primary Examiner* — Nicholas T Corbo
(74) *Attorney, Agent, or Firm* — Fish & Richardson P.C.

(57) ABSTRACT

This document describes systems, methods, devices, and other techniques for determining media items to insert in a media stream. A first media client can play a primary media stream that is multicast to various media clients including the first media client and other media clients. The first media client identifies a start of a primary programming timeslot in the primary media stream, and in response, obtains and stores a secondary media item. After storing the secondary media item at the first media client, the first media client detects an insertion signal in the primary media stream that indicates a secondary programming timeslot is about to begin in the primary media stream. The first media client can then play the secondary media item in place of the primary media stream during the secondary programming timeslot.

20 Claims, 7 Drawing Sheets

(51) Int. Cl.
    *H04N 21/858*    (2011.01)
    *H04N 21/81*     (2011.01)

(56) References Cited

U.S. PATENT DOCUMENTS

| | | |
|---|---|---|
| 7,934,230 B2 | 4/2011 | Badt et al. |
| 8,793,738 B2 | 7/2014 | Klosterman et al. |
| 8,910,198 B2 | 12/2014 | Kelsen et al. |
| 2009/0307732 A1 | 12/2009 | Cohen et al. |
| 2014/0259059 A1 | 9/2014 | Evans et al. |
| 2016/0029050 A1 | 1/2016 | Thornburgh |
| 2017/0019711 A1 | 1/2017 | Feltham et al. |
| 2017/0142496 A1 | 5/2017 | Malhotra et al. |

OTHER PUBLICATIONS

'www.digitalglue.com' [online] "Ad Insertion within a statistical multiplexing pool: Monetizing your content with no compromise on picture quality," Pascal Jezequel, May 2013 [retrieved on Jun. 22, 2017] Retrieved from Internet: URL<http://www.digitalglue.com/pdf/flexsplice_for_ad_insertion_white_paper_cdt-5188d.pdf> 11 pages.
International Search Report and Written Opinion issued in International Application No. PCT/US2018/018779, dated Jun. 14, 2018, 14 pages.

EFFICIENT INSERTION OF MEDIA ITEMS IN MEDIA STREAMS

CROSS-REFERENCE TO RELATED APPLICATIONS

This application is a continuation of and claims priority to U.S. application Ser. No. 15/630,254, filed on Jun. 22, 2017, the entire contents of which are hereby incorporated by reference.

BACKGROUND

Television broadcasts commonly include interruptions from scheduled programming to play commercials from sponsors of a television network. Insertion of commercials into a national video stream, such as local commercials, has traditionally been performed at a headend of a cable or satellite television system.

SUMMARY

This specification discloses systems, methods, devices, and other techniques for inserting secondary media items into primary media streams. For example, a television receiver such as a cable, satellite, or internet protocol (IP)-based set-top box may play primary programming items streamed on a network channel, such as a news or sports show, or a movie. Before a scheduled break in the primary programming occurs, such as for a commercial break, the television receiver may pre-fetch a secondary video to play during the commercial break and store it in memory of the receiver. In order to minimize the number of secondary videos stored in memory at a given time, the receiver may pre-fetch videos on a periodic basis, e.g., every 30 minutes for one or more breaks that are anticipated to occur during the next half-hour timeslot. Moreover, in some implementations, the receiver may obtain a secondary video to play during an upcoming break from a multicast channel that is reserved for playing short, secondary videos on a continuous basis. The receiver may identify when a target video is played on the multicast channel, and may record and locally store the video at the receiver so that it is available to play during the next break from primary content in the primary video stream.

Some implementations of the subject matter described herein include a computer-implemented method. The method can include playing, at a first media client, a primary media stream that is multicast to multiple media clients including the first media client and other media clients. The first media client identifies a start of a primary programming timeslot in the primary media stream, and in response, obtains and stores a secondary media item. After storing the secondary media item at the first media client, the first media client detects an insertion signal in the primary media stream that indicates a secondary programming timeslot is about to begin in the primary media stream. The first media client can then play the secondary media item in place of the primary media stream during the secondary programming timeslot.

These and other implementations can optionally include one or more of the following features.

The primary programming timeslot can include one or more first time intervals for playing a primary media item in the primary media stream and a second time interval that defines the secondary programming timeslot for playing media other than the primary media item. Identifying the start of the primary programming timeslot can include identifying that a relationship between a current time at the first media client and a starting time of the primary programming timeslot is satisfied.

The first media client can identify a series of primary programming timeslots in the primary media stream. For each primary programming timeslot in the primary media stream and before an insertion signal is detected in the primary programming timeslot, the first media client can determine whether to obtain a secondary media item to play during a secondary programming timeslot embedded in the primary programming timeslot.

The first media client can be a television client that is configured to receive multiple multicast video streams over multiple channels. The primary media stream can be one of the multiple multicast video streams.

The television client can be further configured to receive the multiple multicast video streams from a cable operator or a satellite operator.

Obtaining the secondary media item can include transmitting, from the first media client and to a server system, a request for secondary media that is available to be played during an anticipated secondary programming timeslot, and receiving, at the first media client, a response to the request, wherein the response includes the secondary media item or identifies a location at which the secondary media item can be retrieved.

The secondary media item can be selected by the server system from a catalog of available media items. The response can indicate a particular timeslot in a multicast media stream other than the primary media stream during which the secondary media item is planned to be played. Obtaining the secondary media item can include accessing the multicast media stream and recording the secondary media item from the multicast media stream during the particular timeslot.

The primary media stream can be streamed on a first television channel. The multicast media stream can be streamed on a second television channel.

The multicast media stream can play a series of candidate secondary media items in succession at least during a particular time interval between the start of the primary programming timeslot in the primary media stream and a start of the secondary programming timeslot.

The series of candidate secondary media items played on the multicast media stream can be compressed so as to increase a quantity of candidate secondary media items played during the particular time interval.

The secondary media item can be selected by the server system from a catalog of available media items based on context information associated with the request.

The insertion signal in the primary media stream can be a cue tone.

The primary media stream can include a default media item in the secondary programming timeslot. Playing the secondary media item can include switching from playing the primary media stream to playing the secondary media item during the secondary programming timeslot so that the secondary media item is presented on a viewing device coupled to the first media client rather than the default media item during the secondary programming timeslot.

Some implementations of the subject matter disclosed herein can include a media client device. The media client device can include a tuner configured to receive a primary media stream that is multicast to multiple media client devices including the media client device, one or more processors, and one or more computer-readable media (e.g., storage devices). The one or more computer-readable media can store instructions that, when executed, cause the one or more processors to implement a presentation interface, a request generator, a network interface, and a secondary media insertion. The presentation interface can play the primary media stream. The request generator can identify a start of a primary programming timeslot in the primary media stream and, in response, can generate a request for a secondary media item. The network interface can transmit the request for the secondary media item and can receive a response to the request that includes the secondary media item or that includes an indication of a location at which the secondary media item can be obtained. The media client device can be configured to obtain the secondary media item using the indication included in the response. The secondary media insertion engine can be configured (i) to detect an insertion signal in the primary media stream that indicates an expected start of a secondary programming timeslot in the primary media stream and (ii) to override a default media item in the primary media stream with the secondary media item during the secondary programming timeslot.

The media client device can be a television client device that includes multiple tuners configured to receive multiple multicast video streams over multiple channels.

The media client device can further include a memory device configured to store the secondary media item for a period of time between when the secondary media item is obtained after the start of the primary programming timeslot and before a start of the secondary programming timeslot.

The media client device can further include a second tuner configured to receive a multicast media stream that is different than the primary media stream. The response can identify a particular timeslot in the multicast media stream during which the secondary media item is planned to be played. The instructions stored on the computer-readable media, when executed, can further cause the one or more processors to implement a multicast memory interface that obtains the secondary media item by recording the multicast media stream during the particular timeslot identified in the response.

Some implementations of the subject matter described herein include one or more computer-readable media (e.g., non-transitory computer-readable media) having instructions stored thereon that, when executed by one or more processors, cause the one or more processors to perform the computer-implemented methods disclosed herein.

The subject matter disclosed herein may, in certain instances, realize one or more of the following advantages. In some implementations, the amount of memory in a media client required to store pre-fetched secondary media items may be reduced by requesting new secondary media items or a list of identifiers of new secondary media items on a periodic basis to play during breaks in a current primary programming timeslot, while discarding items that were played in previous programming timeslots. For example, rather than pre-downloading an entire catalog of secondary media items, the local media client may only need to store one or two secondary media items for the immediately upcoming secondary programming timeslot. Additionally, by requesting a secondary media item, or requesting an identifier of a new secondary media item, and at least beginning to retrieve (e.g., download) the secondary media item before an insertion signal for the next secondary programming timeslot occurs, a media client may obtain larger files (e.g., having higher video resolution) for the secondary media item than would otherwise be feasible if the item is not retrieved until after the insertion signal was detected. The additional time afforded for retrieving a secondary media item may also increase the likelihood of successful retrieval if there is latency in responding to a request for the secondary media item. In some implementations, multicasting candidate secondary media items on a dedicated media stream (e.g., a hidden TV channel) allows secondary items to be efficiently delivered to a large number of media clients. Moreover, such multicast delivery on a particular stream or channel can, in some instances, reduce spikes in network traffic that may result if many media clients requested unicast delivery of various secondary items at the same time. Additional features and advantages will be recognized by persons of ordinary skill in the art in light of the entire disclosure.

DESCRIPTION OF DRAWINGS

Like reference symbols in the various drawings indicate like elements.

DETAILED DESCRIPTION

This specification discloses systems, methods, devices, and other techniques for inserting secondary media items into primary media streams. For example, the specification discloses how a media client, e.g., a television set-top box, can insert short videos into a primary video stream, e.g., a television stream from a cable or satellite operator. In some implementations, a media client retrieves a secondary media item for insertion in an upcoming programming slot before an insertion signal is detected that identifies the programming slot. Further, the media client can retrieve the secondary media item by recording it from a secondary media multicast stream, e.g., a hidden television channel that constantly plays secondary media items that are candidates for insertion into various clients' media streams. These and other techniques disclosed herein can, in some instances, permit insertion of contextually relevant media into media streams while conserving storage space in a memory of the media client.

Figure 1:
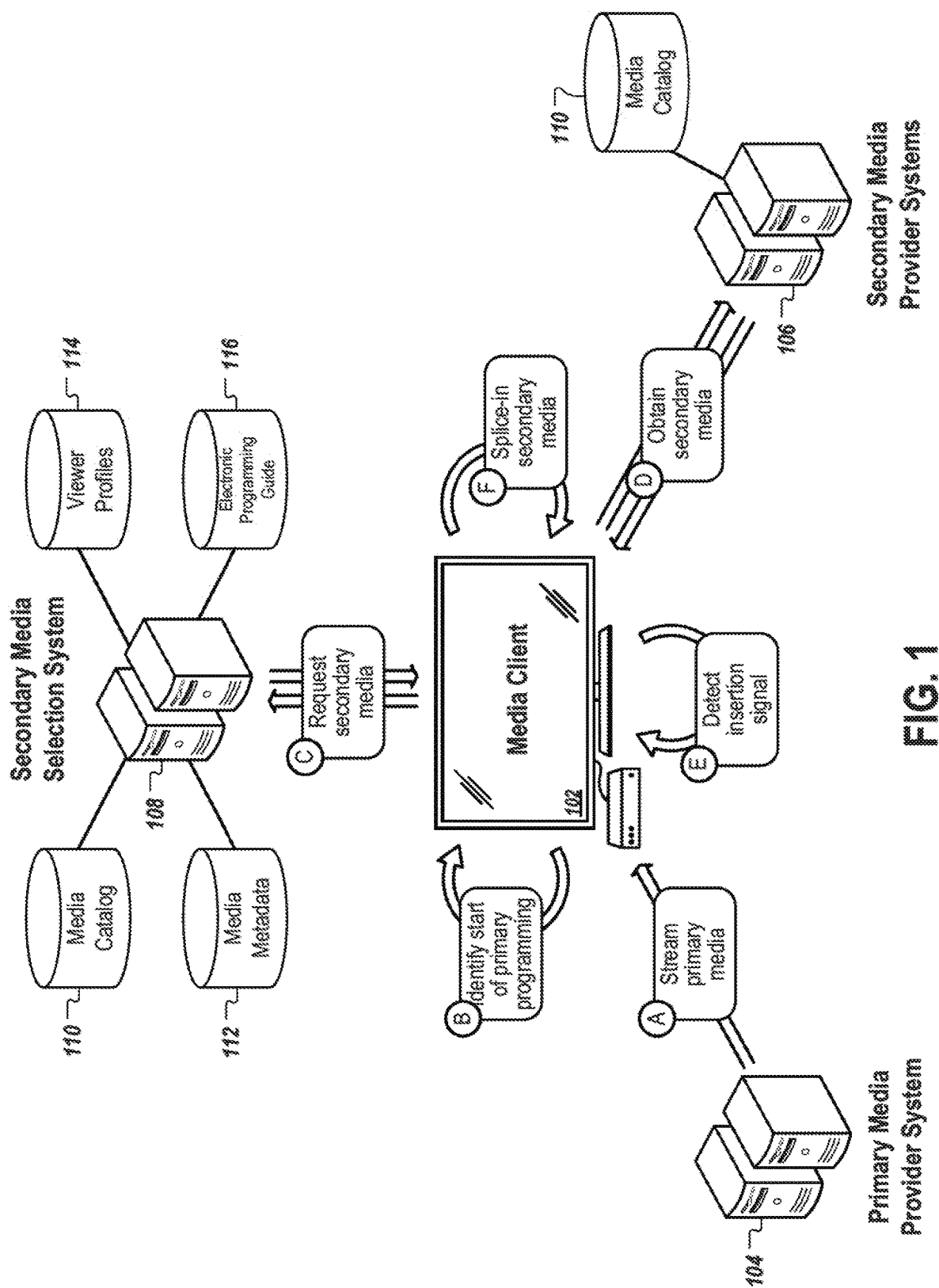
FIG. 1 is a conceptual illustration of an example environment of a media client that streams media from a primary media provider system and periodically interrupts the primary stream to play a secondary media item during designated timeslots of the primary stream.

Referring to FIG. 1, an example environment is depicted of a media client 102 that streams media from a primary media provider system and periodically interrupts the primary stream to play a secondary media item during designated timeslots of the primary stream. The environment includes a media client 102, a primary media provider system 104, one or more secondary media provider systems 106, and a secondary media selection system 108.

In general, the media client 102 is a device that is configured to process incoming media streams and to output a media stream for presentation to one or more users, e.g., on a television. In some implementations, the media client 102 is a standalone device that includes a wired or wireless interface to connect to a presentation device such as a TV or computer monitor. For example, the media client 102 may be a set-top box for cable, satellite, or internet protocol (IP)-based TV systems. In other implementations, the media client 102 is an integrated component of another device, such as a mobile computing device (e.g., a smartphone, a tablet computing device, a notebook computing device, a smart watch or other wearable computing devices) or a smart TV. Further detail about a media clients such as media client 102 is shown and described with respect to FIG. 2.

The media client 102 can communicate with a primary media provider system 104 to obtain one or more primary media streams. The system 104 can be implemented on one or more computers in one or more locations. In some implementations, the primary media provider system 104 is operated by a cable TV provider, a satellite TV provider, or an IP-based TV service provider. For example, a cable or satellite provider may constantly transmit a plurality of media streams to the media client 102, where each media stream is accessible on a different frequency channel. A stream on a first channel may include media from a first television network, a stream on a second channel may include media from a second television network, and so forth. In some implementations, primary media streams may be multicast from the primary media provider system 104 to many media clients, including media client 102 such that a given media stream is received by each of the media clients. In other implementations, a primary media stream may be unicast to a particular media client 102.

The media client 102 can also communicate with a secondary media provider systems 106 and secondary media selection system 108. Although the primary media provider system 104, secondary media provider systems 106, and secondary media selection system 108 are depicted as separate systems in FIG. 1, in other implementations any two of the systems 104, 106, and 108, or all three systems, may be integrated into a single, larger system that provides the various features of the individually described systems 104, 106, and 108 in FIG. 1. The secondary provider systems 106 and secondary media selection system 108 may each be implemented on one or more computers in one or more locations.

The secondary media selection system 108 is configured to determine secondary media items for the media client 102 to insert into a primary media stream played at the media client 102. Secondary media items are generally media items that are not part of the primary programming in a primary media stream. For example, the primary media provider system 104 may distribute a primary media stream for a particular TV network to subscribers of the primary media provider. The primary media stream may include video content such as situational comedies, dramas, movies, news, and sporting events that the TV network has developed as primary programming for the media stream on the network's channel. Each item of primary media content from the network may be played over one or more primary programming timeslots in the network's media stream. A primary programming timeslot is a block of time reserved for playing a particular primary media item. For example, a network may schedule its primary programming timeslots to occur every 30 minutes at the top and bottom of each hour. A half-hour show may run in a primary programming timeslot from 9 AM to 9:30 AM, for instance. A feature-length film may extend over several half-hour timeslots.

Moreover, each primary programming timeslot can include one or more secondary programming timeslots. Secondary programming timeslots are portions of a media stream that have been reserved to play secondary media items which are not part of the primary programming in the media stream. In some cases, a secondary timeslot may be provided at or near a middle or an end of a primary programming timeslot and are generally short in duration relative to the primary timeslot in which the secondary timeslot is embedded. For example, during a 30-minute primary programming timeslot, 22 minutes may be reserved for playing primary media items, while the remaining 8 minutes may be reserved for playing secondary media items such as national or local commercials/advertisements. In some implementations, the primary media provider system 104 fills the secondary programming timeslots with default secondary media items, e.g., advertisements for a nation-wide campaign. The media client 102, however, may obtain a different secondary media item, e.g., an advertisement for a locally based campaign, to splice into a primary media stream, thereby overriding the default item during a secondary programming timeslot. Nonetheless, if the media client 102 is unable to splice in a different secondary item, than the default item can still be presented by playing the primary media stream without interruption.

The secondary media selection system 108 can maintain a catalog 110 of secondary media items, which can be implemented on one or more computers. The catalog 110 stores data that identifies a collection of secondary media items that are available to place in media streams for a population of media clients. When the secondary media selection system 108 receives a request from the media client 102 for a secondary media item (where the request may be to obtain a copy of the media item itself or may be a request for a reference to a location where the media item is available to be accessed, such as a request for an identifier of a secondary media item), the system 108 can search the media catalog 110 to determine one or more items to return in response to the request from the collection identified in the catalog 110. In some implementations, the media catalog 110 is a database that identifies available secondary media items and includes references (e.g., a universal resource indicator (URI) or other pointer) to locations where the secondary items are stored or are otherwise available to be accessed by the media client 102. In some implementations, the media catalog 110 further includes one or more non-volatile storage devices storing files for each of the available secondary media items so that they may be served directly to the media client 102 in response to a request. In other implementations, the files for the secondary media items may be served from other locations such as the respective secondary media provider system 106 for a secondary media provider that submitted a given secondary media item, from the primary media provider system 104, or from multiple locations. In some instances, the media client 102 may use an indication in a response of the location that a selected secondary media item is stored to access and obtain the selected item.

In some implementations, the secondary media selection system 108 uses context information associated with a request from a media client 102 to select a particular secondary media item that a viewer at the media client 102 is likely to be interested in. Some secondary media items in the catalog 110 may be local items that are intended for viewers within particular geographic regions. The secondary selection system 108 may analyze a received request from the media client 102 to identify a location associated with the request (e.g., by comparing an IP address of the media client 102 to a database that maps IP addresses to geographic regions) and then selecting one of the available secondary media items from catalog 110 that is assigned to a region that includes the location associated with the request. Location information and other information about secondary media items can be stored in in a media metadata database 112. The metadata database 112 may store information for each secondary media item such as keywords indicating topics of the media item, a length of the media item, historical performance metrics of the media item (e.g., number of impressions, frequency of actions taken by viewers that see the media item, viewership ratings for the media item), a whitelist of media streams that the media item is permitted to be inserted in (e.g., particular TV channels or networks that the media item has been designated for), a blacklist of media streams that the media item is not permitted to be inserted in (e.g., particular TV channels or networks that the media item is not permitted to be aired on), a whitelist of times during which the media item is available for insertion (e.g., some media items may be intended only for morning insertions while other media items may be intended only for late-night insertions), a blacklist of times during which the media item is unavailable for insertion in a media stream, or a combination of these and other factors.

Additionally, the secondary media selection system 108 may maintain a viewer profiles database 114 that stores information about consumers (e.g., viewers) of primary and secondary media items. The database 114 may, for example, indicate viewer preferences for particular genres of media content, keywords indicating topics of interest to viewers, locations of viewers, and historical viewing profiles for individual viewers or groups of viewers. The secondary media selection system 116 can also include an electronic programming guide 116 that maintains programming data indicating a schedule of primary media items played on one or more streams from the primary media provider system 104. Using context information associated with a request and the data stored in metadata database 112, viewer profiles database 114, the electronic programming guide 116, or a combination of these, the secondary media selection system 108 may select one or more secondary media items for a media client 102 to insert in a secondary programming timeslot of a media stream. For example, a request from the media client 102 may include an identifier of the media client 102, an identifier of a viewer of the media client 102, an identifier of a primary media stream or a primary media item in which the secondary media item will be inserted, an indication of a time that the secondary media item is planned to be inserted, an indication of a location of the media client 102, an anticipated length of the secondary timeslot, or a combination of two or more of these or other factors. The secondary media selection system 108 may compare information in the request to information in databases 112, 114, and/or 116 to determine a particular secondary media item from the catalog 110 to return in response to the request.

In some implementations, the media client 102 can perform a process to obtain a secondary media item and insert the item into a primary media stream, as illustrated in FIG. 1. At stage A, the media client 102 plays a primary media stream that is transmitted from the primary media provider system 104. At stage B, the media client 102 recognizes the start of a new primary programming timeslot. For example, a new half-hour segment in a media schedule may begin, which triggers the media client 102 to generate a request to the secondary media selection system 108 for a secondary media item at stage C. At stage D, the media client 102 obtains a secondary media item based on a response to the request from the secondary media selection system 108. The secondary media item can be obtained in various ways, but in this example, the media client 102 requests the secondary media item from a secondary media provider system 106 using information about the location of the item (e.g., a URI or URL) received in a response from the secondary media selection system 108. In other examples, the secondary media item is multicast on a hidden channel to a population of media clients, and the media client 102 uses an identifier of the secondary media item to retrieve the item from the multicast channel. At stage E, the media client 102 detects an insertion signal in the primary media stream. The insertion signal, e.g., a cue tone, is encoded in the primary media stream and indicates to the media client 102 that a secondary programming timeslot is about to begin. At the start of the secondary media programming timeslot, the media client 102 can then switch from playing the primary media stream to playing the one or more secondary media items for the duration of the timeslot. At the end of the secondary programming timeslot, the media client 102 can then revert to playing the primary media stream. Further detail about the operations performed by media client 102 are described with respect to FIGS. 2-6.

Figure 2:
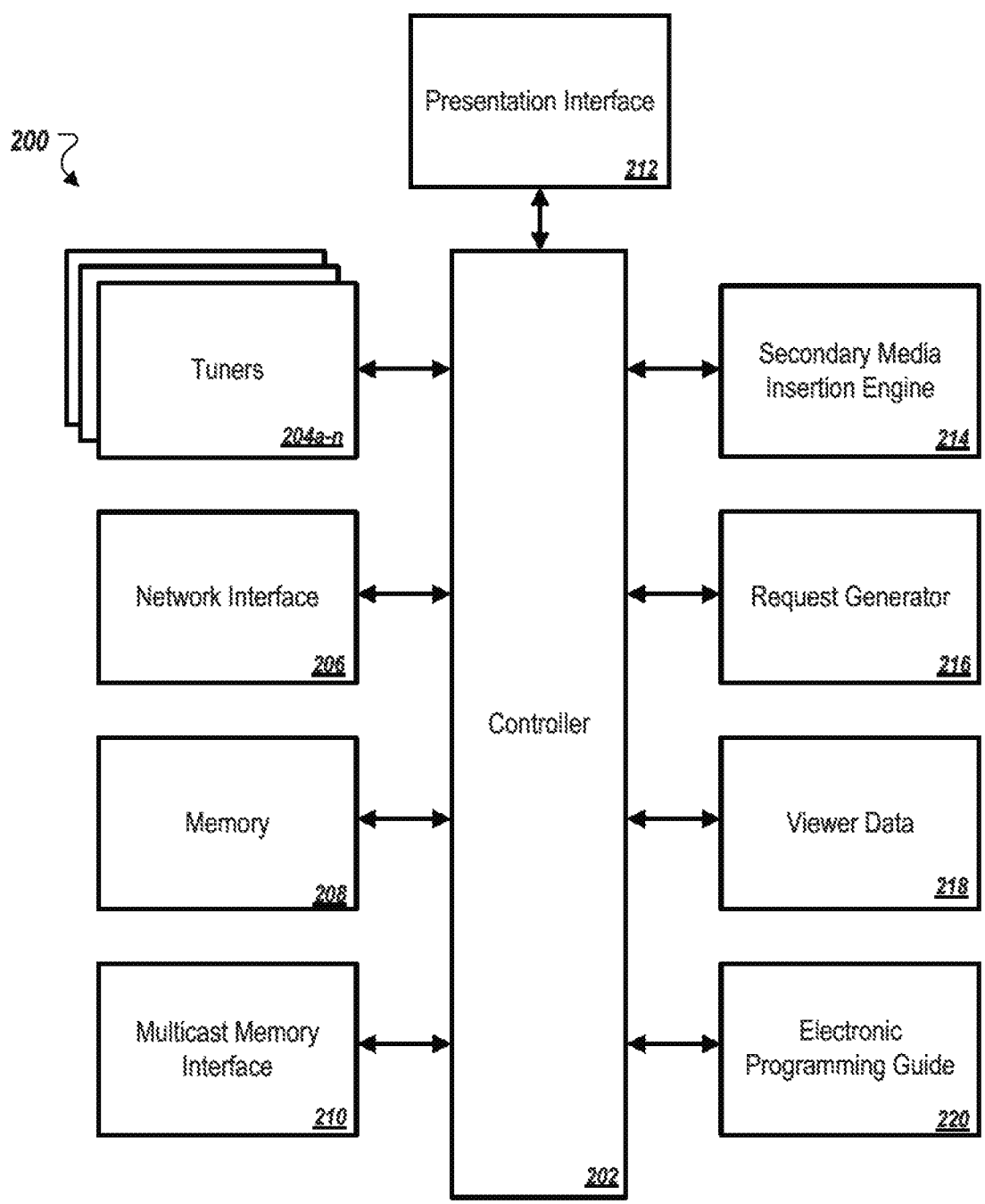
FIG. 2 shows a block diagram of an example media client device.

FIG. 2 is a block diagram of an example media client 200. In some implementations the media client 200 is a media client like those discussed with respect to FIGS. 1 and 3-6. For example, media client 200 can be a device that is configured to process incoming media streams and to output a media stream for presentation to one or more users, e.g., on a television. In some implementations, the media client 200 is a standalone device that includes a wired or wireless interface to connect to a presentation device such as a TV or computer monitor. For example, the media client 200 may be a set-top box for cable, satellite, or internet protocol (IP)-based TV systems. In other implementations, the media client 200 is an integrated component of another device, such as a mobile computing device (e.g., a smartphone, a tablet computing device, a notebook computing device, a smart watch or other wearable computing devices) or a smart TV.

The media client 200 includes a controller 202 and various additional components 204-220. Although FIG. 2 shows a particular configuration of one example of media client 200, other media clients may have fewer or additional components. In some implementations, aspects of the components 202-220 may be combined or divided in different ways than what is shown in the example media client 200 in order to perform similar operations to those described herein.

The controller 202 can be implemented as one or more computer processors, e.g., microcontrollers, digital circuits, mini-computers, digital signal processors, or application-specific integrated circuits (ASICs). The controller 202 can interface with each of the components 204-220 and communicate data between the components 204-220. The controller 202 may store instructions in computer-readable media and to execute the instructions to cause performance of operations such as those discussed herein.

The media client 200 can further include one or more tuners 204a-n. The tuners 204a-n are configured to tune to media streams from primary or secondary media providers.

Each tuner 204a-n is generally capable of tuning to a particular media stream independent of the states of other ones of the tuners 204a-n. For example, a tuner in a set-top box for a cable or satellite provider may include electrical hardware to select a media stream on a channel for a particular frequency band, and to de-modulate, amplify, and filter the signal to obtain a baseband signal or digital data for the selected media stream that can be played to an audience. An output signal of the tuners 204a-n may be provided as input to the presentation interface 212, which then uses the signal to play the media stream on one or more devices (e.g., on a television set, a computer monitor and speakers, a mobile device display and speakers).

The media client can further include a request generator 216. The request generator 216 is configured to generate a secondary media item request that can fill an upcoming secondary programming timeslot in a media stream currently being played by the media client 200. The request generator 216 can then provide the request to network interface 206, which transmits the request to a secondary media selection system, e.g., secondary media selection system 108. In some implementations, the request generator 216 embeds context information in requests, such as an identifier of the media client 102, an identifier of a viewer of the media client 102, an identifier of a primary media stream or a primary media item in which the secondary media item will be inserted, an indication of a time that the secondary media item is planned to be inserted, an indication of a location of the media client 102, an anticipated length of the secondary timeslot, or a combination of two or more of these or other context items. Context information that may be embedded in the request can be stored in viewer data database 218, electronic programming guide 220, or both, for example. The secondary media selection system 106 can then match attributes of candidate secondary media items to context information provided in the request to select secondary media items to return responsive to a request.

In some implementations, the request generator 216 includes an event listener that listens for occurrence of one or more pre-defined events to trigger generation and transmittal of a a request for a secondary media item. In some implementations, the triggering event is a start of a new primary programming timeslot in a media stream. For example, in a given media stream, primary media items may be scheduled in 30 minute intervals. Thus, a first show may run on a primary media stream from 9:00-9:30 AM, a second show may run from 9:30-10 AM, and a third show may run from 10-11 AM. At the start of each half-hour block of time, the request generator 216 may generate a new request for secondary media items to fill in one or more expected secondary programming timeslots during the starting 30-minute block of time (i.e., the staring primary programming timeslot). Thus, for example, the media client 200 may generate and transmit a request for secondary media every 30 minutes, every 15 minutes, every 60 minutes, or otherwise depending on the scheduling of programming slots in a media stream. In some implementations, the request generator 216 generates a new request for secondary media multiple times during a single primary programming media slot, e.g., to obtain secondary media for multiple secondary programming timeslots during the primary programming timeslot. In general, the requests for secondary media may for an upcoming secondary programming timeslot are generated and transmitted before an insertion signal is detected which alerts the media client 200 to the upcoming secondary programming timeslot, while still only requesting secondary media items that are actually planned to fill an upcoming secondary programming timeslot (e.g., rather than pre-downloading an entire catalog of secondary media and later selecting one of the items to present from the catalog at insertion time).

A memory 208 of the media client 200 includes one or more storage devices configured to store secondary media items that are planned to be inserted into a media stream in an upcoming secondary programming timeslot. After the media client 200 has requested and obtained a secondary media item for an upcoming timeslot, the item may be stored (e.g., cached) in the memory 208 so that it is available to be played at the start of the secondary programming timeslot. In some implementations, the storage devices of memory 208 include hard disk drives that store digital data on a magnetic disk. In some implementations, the storage devices of memory 208 are solid-state storage devices (e.g., flash memory). As some media clients become increasingly commoditized, manufacturers may provide relatively little amount of memory 208 to store video or other media items. In some implementations, the techniques disclosed herein permit personalized selection of secondary media items without consuming an excessive amount of storage space in the memory 208. For example, rather than pre-downloading a catalog of secondary media items, the client 200 may fetch and pre-store only secondary media items that are planned to be inserted in an upcoming secondary programming timeslot. After the items are played during that timeslot, the items may be deleted from the memory 208 to free space for items that can be inserted in a next secondary programming timeslot.

The media client 200 can obtain a secondary media item from a remote server using at least one of several possible approaches. In some implementations, the client 200 receives a secondary media item via the network interface 206 in a response to a secondary media request. Alternatively, the response to a secondary media request can includes a pointer to a location that the secondary media item can be accessed, although the response itself does not actually include the secondary media item. In some implementations, the pointer references a location on a remote computing system. The network interface 206 can request the identified secondary media item from the location indicated by the pointer. In other implementations, a media provider system (e.g., primary media provider system or a secondary media provider system) transmit a special media stream to the media client 200 that is dedicated to playing secondary media items. This media stream may be multicast to multiple media client devices and, for example, may be provided on a "hidden" television channel that is not generally accessible to users during normal operation of the media clients. Different candidate secondary media items may be played on the channel during a succession of timeslots. In some implementations, the location of a selected secondary media item identified in response to a secondary media request is an indication of a particular timeslot in the dedicated media stream during which the selected secondary media item is scheduled to play. The multicast memory interface 210 uses the indication of the selected secondary media item (e.g., an identifier of a timeslot in the dedicated media stream that the selected secondary media item will be played and/or an identifier of the secondary media item itself) to detect the selected secondary media item in the dedicated media stream and to record the selected item from the stream for future playback during an upcoming secondary programming timeslot. Additional detail concerning techniques for multicasting a dedicated secondary media stream and obtaining a selected item on the media stream are described with respect to FIGS. 5 and 6.

The media client 200 can include a secondary media insertion engine 214 that inserts a selected secondary media item into a secondary programming timeslot of a played media stream. For instance, the media client 200 may play a primary media stream on a particular television channel that one of the device's tuners 204 is tuned to. Near a mid-point of a primary programming timeslot for a primary media item being played in the primary media stream, the secondary media insertion engine 214 may identify an insertion signal in the primary media stream. The insertion signal may be a cue tone or other signal that alerts the secondary media insertion engine 214 to the fact that a secondary programming timeslot is about to begin. The secondary programming timeslot may begin, for example, within 1-10 seconds of a time that the insertion signal occurs in the primary media stream. The interval between the insertion signal and the start of the secondary programming timeslot may be fixed or may be indicated by data encoded in the insertion signal. In response to the insertion signal, the secondary media insertion engine 214 accesses the pre-stored secondary media item from memory 208 and, at the start of the secondary programming timeslot, "splices in" the secondary media item to cause the secondary media item to be played through the presentation interface 212 rather than a default media item contained in the primary media stream. At the completion of the secondary programming timeslot, the secondary media insertion engine 214 releases control and the presentation interface 212 reverts to playing the primary media stream. In this manner, a secondary media item that has been selected for a particular user or group of users who consume media items played through the media client 200 can be played for these users, rather than a generic media item that is less likely to be tailored to a particular audience.

In some implementations, the media client 200 is configured to predict when insertion signals will occur in a primary media stream and to automatically schedule a secondary media item request based on the predicted times that the insertion signals will occur. The media client 200 may, for example, access a local or remotely stored insertion signal prediction model that predicts times that one or more insertion signal signals will occur in a primary media stream based on one or more predictive inputs provided to the model. The predictive inputs can include, for example, an identity of the primary media stream (e.g., an identifier of a network or channel that the media client 200 is tuned to and on which the insertions signals and secondary programming slots are predicted to occur), a current time of day, a current day of the week, an identity of a primary media item being played (e.g., an identity of a particular movie or television show), a type of the primary media item being played (e.g., news program, live sporting event, pre-recorded situational comedy, pre-recorded drama, movie), a length of the primary media item being played (e.g., 30-minute show, 60-minute show, or 2 hour movie), or a combination of two or more of these and/or other predictive inputs. The insertion signal prediction model can process the predictive inputs to generate a predictive output that indicates an estimated time that the next insertion signal and/or secondary programming timeslot will occur on the currently played primary media stream. In some implementations, the insertion signal prediction model is learned over time based on historical occurrences of insertion signals and the conditions under which they occurred.

In some implementations, the media client 200 uses the predictive output from the model to schedule times at which the request generator 216 will generate and transmit requests for one or more secondary media items to play during the next anticipated secondary programming timeslot. For example, the media client 200 may be configured to transmit requests for secondary media items a pre-defined length of time before the next predicted insertion signal and/or secondary programming timeslot, e.g., 15 minutes. If the next insertion signal is not expected to occur for another 30 minutes, the request generator 216 may delay requesting a secondary media item for the next secondary programming timeslot for 15 minutes so that it is requested only 15 minutes before the timeslot.

In some implementations, the insertion signal prediction model processes the predictive inputs to generate a predictive output that indicates an estimated frequency of insertion signals on the currently played primary media stream. For example, a first television channel may provide secondary programming timeslots (and corresponding insertion signals) every 15 minutes, and therefore the media client 200 can schedule secondary media item requests every 15 minutes. But for a second television channel that provides secondary programming timeslots (and corresponding insertion signals) every 30 minutes, the media client 200 may schedule secondary media item requests only every 30 minutes. In this manner, the media client 200 may request and obtain secondary media items only for the next expected secondary programming timeslot, but before the insertion signal for that timeslot occurs, rather than pre-caching an entire catalog of secondary media items, which may be infeasible if the memory 208 has a limited storage capacity. In some implementations, the media client 200 can schedule secondary media item requests based on certain criteria and using the output of the insertion signal prediction model independent of the start of a primary programming timeslot.

Figure 3:
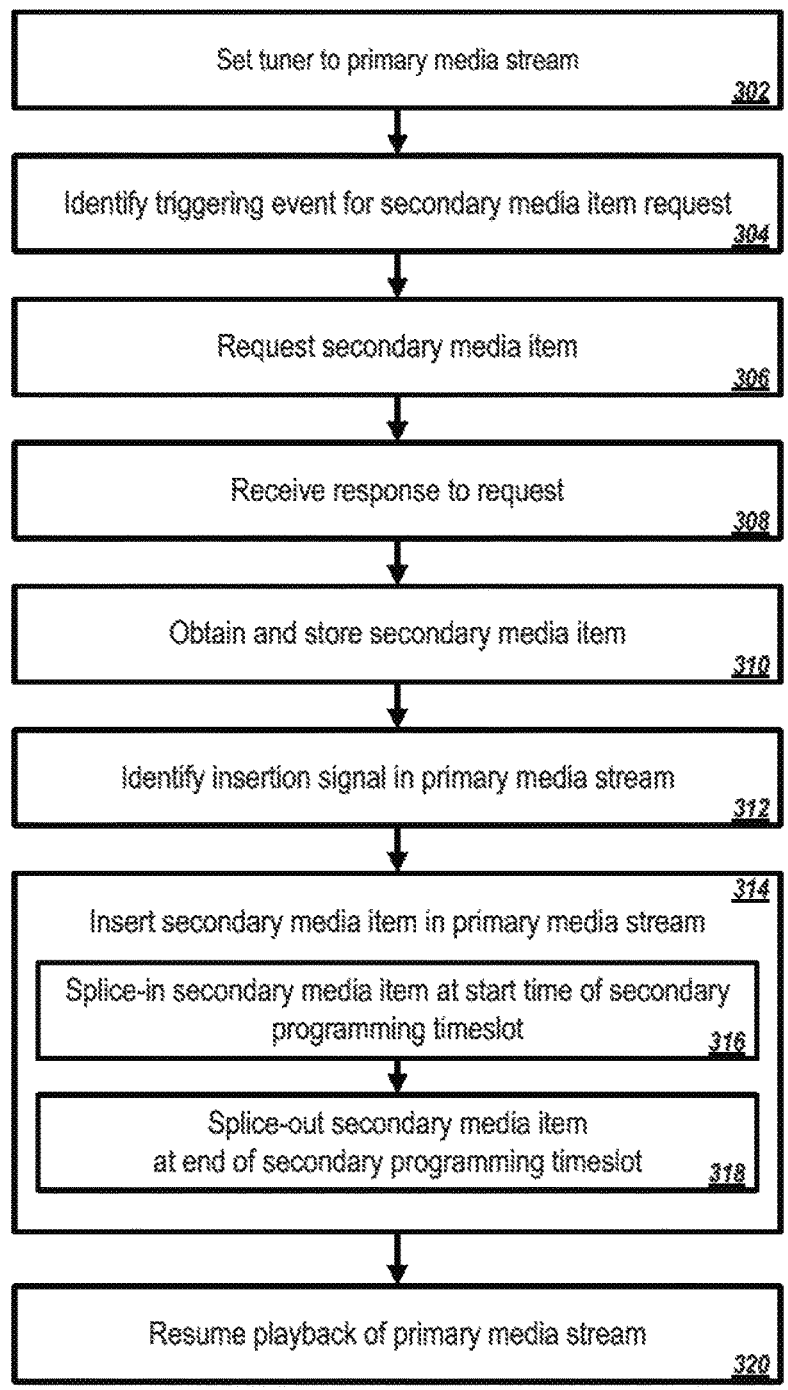
FIG. 3 is a flowchart of an example process for identifying and inserting a secondary media item into a media stream played at a media client.

FIG. 3 is a flowchart of an example process 300 for identifying and inserting a secondary media item into a media stream played at a media client. In some implementations, the process 300 can be carried out by a media client, e.g., media client 102 (FIG. 1) or media client 200 (FIG. 2).

At stage 302, a media client begins playing a primary stream of media content. In the context of a television with a cable, satellite, or IP-based set-top box, for example, the set-top box may tune to a particular channel that includes the primary media stream based on an instruction from a user of the set-top box.

At stage 304, an event occurs that triggers the media client to generate and transmit a request for one or more secondary media items to play during an upcoming secondary programming timeslot. In some implementations, the media client makes secondary media requests periodically, e.g., at the start of each primary programming timeslot in the primary media stream. In some implementations, the media client makes secondary media requests between each anticipated secondary programming timeslot. For example, a television network may break for commercial approximately every 15 minutes. After each break, the media client may issue a new request for secondary media to play during the next break. However, in general, the media client requests secondary media for an upcoming secondary programming timeslot before an insertion signal appears in the primary media stream indicating that the secondary timeslot is about to start. The media client requests the media item from a secondary media selection system at stage 306.

At stage 308, the media client receives a response to the secondary media request. The response identifies a particular secondary media item that the secondary media selection system has selected to be played during the upcoming secondary programming timeslot. In some implementations, the selected media item is selected based on context information associated with the request, so as to increase a likelihood that the secondary media item is well-received by the particular users of the media client. The response may include a copy of the secondary media item or may include information that is usable by the media client to fetch the secondary media item from another source (e.g., an identifier of the secondary media item that the media client can use to record the item on a hidden channel).

At stage 310, the media client obtains the secondary media item that has been selected for the upcoming secondary programming timeslot. If the secondary media item is not directly included in the response to the client's request from stage 308, then the client may access the secondary media item elsewhere. In some implementations, the media client extracts the secondary media item from a second media stream that the client is tuned to on a second channel, e.g., using a second tuner or tuning process of the media client. The second media stream may be a multicast stream that is dedicated to playing candidate secondary media items in succession during a series of timeslots in the media stream. The client may record the selected secondary item from the second media stream during a corresponding timeslot in which the selected item is played, and store the recorded item in memory. Techniques for capturing a selected secondary media item from a multicast stream are further described with respect to FIGS. 5 and 6.

At stage 312, after identifying an item to play for the next secondary programming timeslot, and in some instances, after having obtained the item, the media client detects an insertion signal in the primary media stream, which has continued to be played since stage 302. The insertion signal alerts the media client to the fact that a secondary programming timeslot is about to begin.

At stage 314, the media client identifies the start of the secondary programming timeslot and switches the client from playing the primary media stream on a presentation device (e.g., a TV) coupled to the media client, to instead play the secondary media item on the presentation device during the secondary programming timeslot. At sub-stage 316, the media client splices in the secondary media item so that this item is played instead of a default media item in the primary media stream. At the completion of the secondary programming timeslot at sub-stage 318, the media client splices out from the secondary media item and returns to playing the primary media stream (stage 320).

In some implementations, the media client may have limited memory storage capacity to store secondary media items in advance of anticipated secondary programming timeslots. Accordingly, the media client may only request media items for the next n expected secondary programming timeslots, where n is a pre-defined integer such as 1, 2, or 3, and typically only for secondary timeslots in a current primary programming timeslot. To clear storage for secondary items that may be obtained for future secondary programming timeslots, the media client may delete recently played secondary media items from memory, e.g., immediately following the secondary programming timeslot in which the items were played. In some implementations, the media client enforces a memory management policy that specifies rules for maintaining and deleting items stored in memory of the media client.

Figure 4:
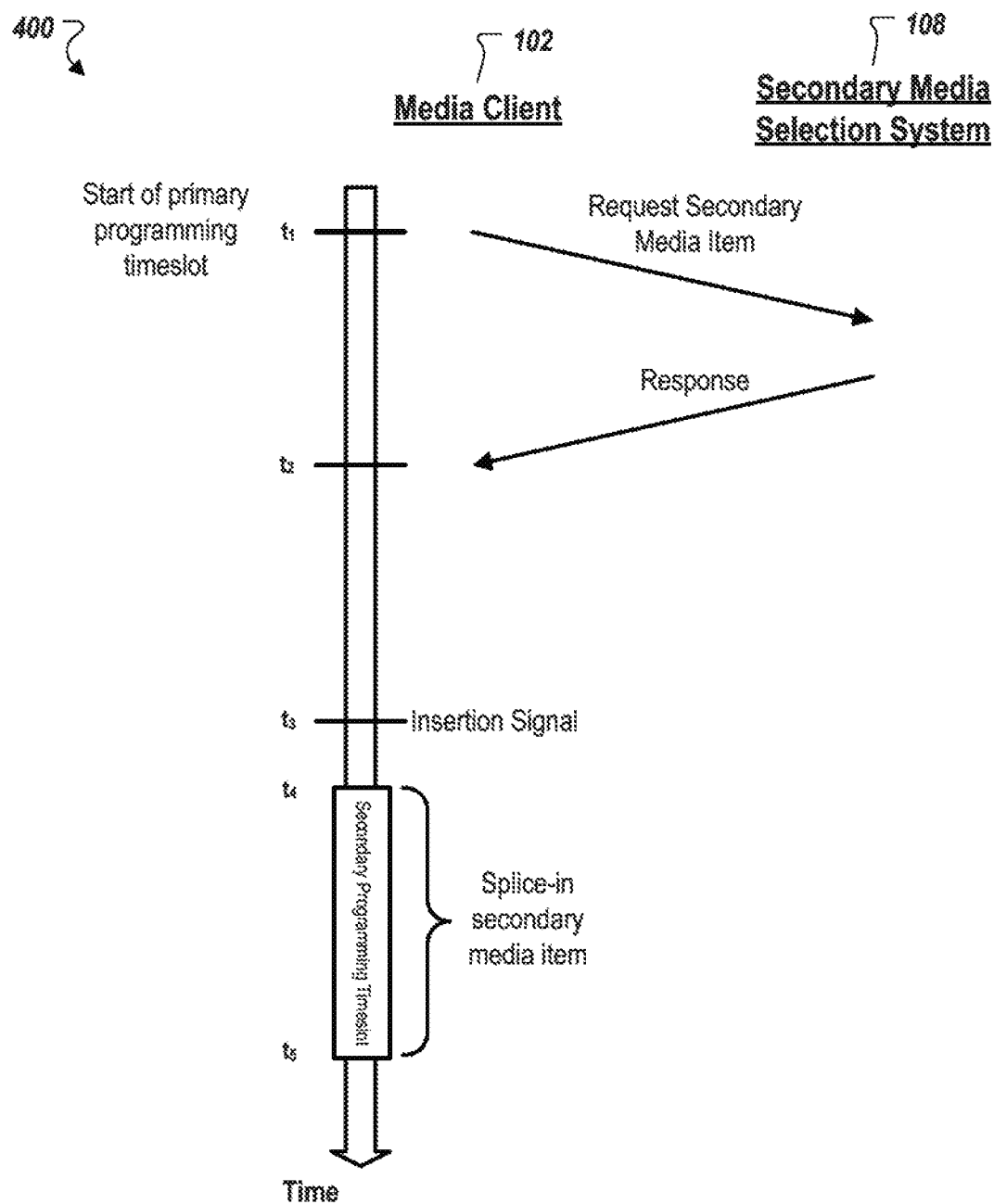
FIG. 4 shows a timing diagram illustrating example operations of a media client and a secondary media selection system to deliver and play a secondary media item in place of a primary media stream.

Referring to FIG. 4, a timing diagram is shown of example operations of a media client 102 and a secondary media selection system 108 to deliver and play a secondary media item in place of a primary media stream.

At time $t_1$, a new primary programming timeslot begins. For example, $t_1$ may represent the start of a 30-minute programming segment on a TV channel. The media client 102 identifies the start of the primary programming timeslot and transmits a request for a secondary media item to the secondary media selection system 108. In some implementations, the request can be generated and transmitted substantially at the start of the primary programming timeslot, or shortly before or after the start of the timeslot. For instance, if the media client 102 identifies that the primary programming timeslot begins in less than a threshold amount of time (e.g., 5-30 seconds), the client 102 may initiate a request to the secondary media selection system 108. In response to the request, the secondary media selection system 108 selects a secondary media item for the media client 102 to play during an upcoming secondary programming timeslot. The secondary media selection system 108 transmits a response back to the media client 102 that includes or otherwise identifies a selected secondary media item, which the media client 102 receives at $t_2$. The media client 102 obtains and stores the selected secondary media item. At time $t_3$, the media client 102 detects an insertion signal. At time $t_4$, shortly after the insertion signal, the next secondary programming timeslot begins and the media client 102 splices in the pre-fetched secondary media item so that the secondary item is played and output by the media client 102 rather than the primary media stream. At $t_5$, i.e., the end of the secondary programming timeslot, the media client 102 splices out from the secondary media item and resumes outputting the primary media stream for presentation to users of the media client 102.

Figure 5:
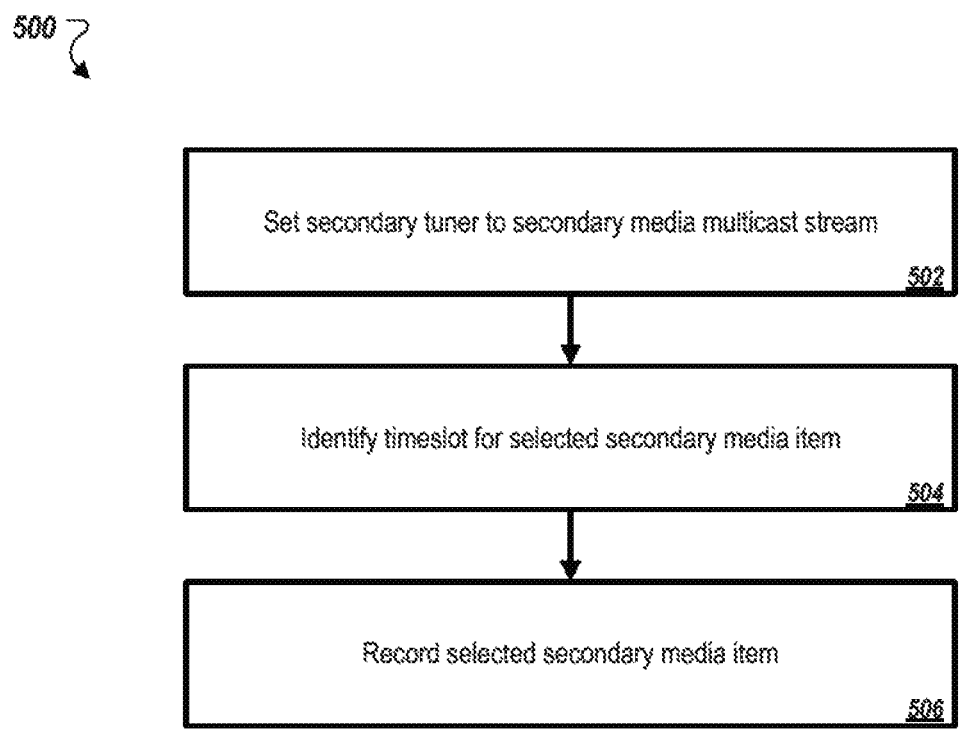
FIG. 5 is a flowchart of an example process for capturing a secondary media item from a multicast media stream.
Figure 6:
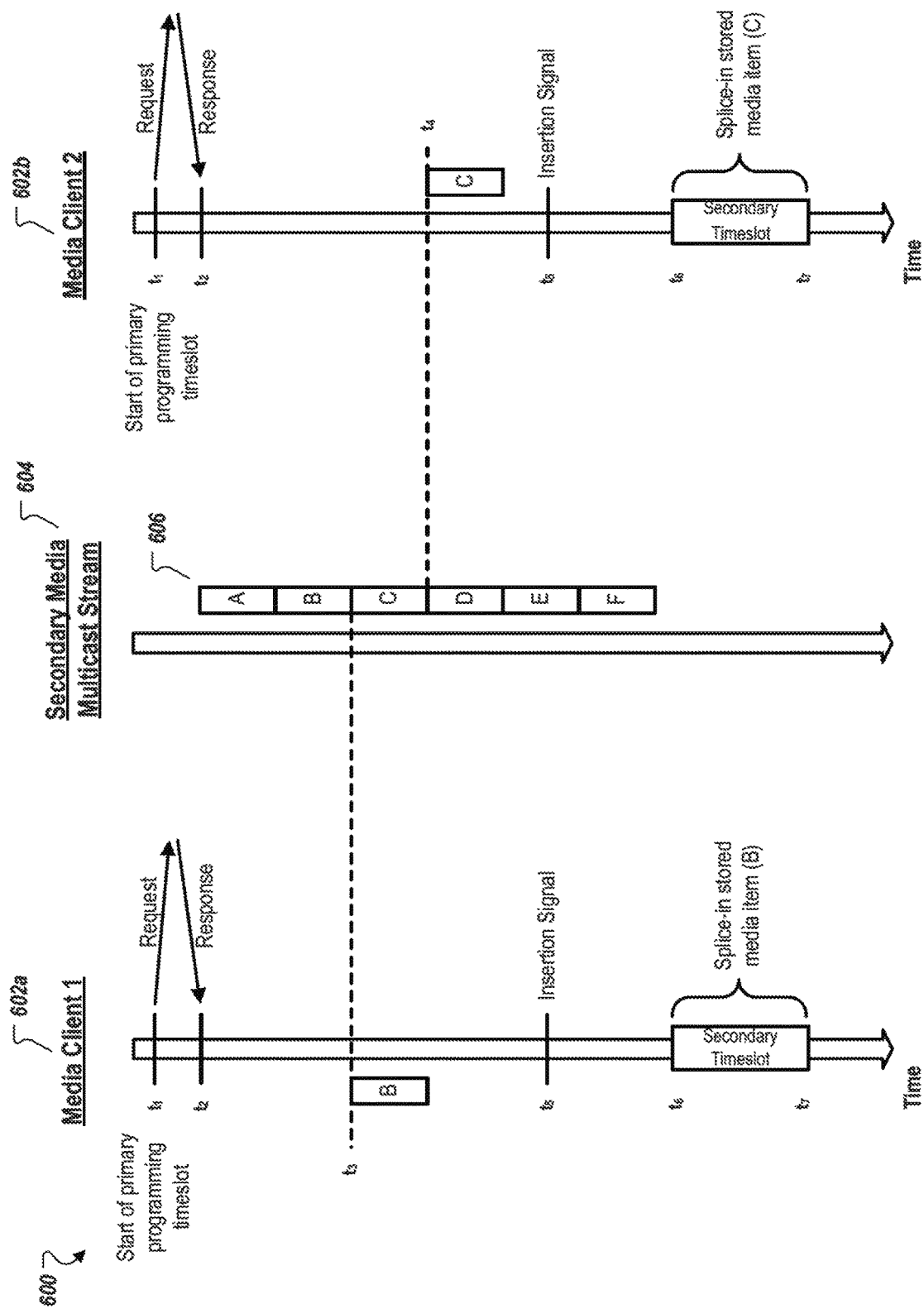
FIG. 6 is a conceptual timing diagram of a pair of media clients that access a secondary media multicast stream to obtain secondary media items to play during an upcoming secondary programming timeslot.

FIG. 5 is a flowchart of an example process 500 for capturing a secondary media item from a multicast media stream. In some implementations, the multicast media stream is a stream that is transmitted to many media clients and is dedicated to playing secondary media items for capture and later re-use during secondary programming timeslots in other primary media streams. An illustration of such a multicast media stream is depicted in FIG. 6, for example.

At stage 502, the media client tunes to the secondary media multicast stream. For example, the media client may include a first tuner that is playing a primary media stream and a second tuner that independently tunes to the secondary media multicast stream while the primary media stream continues to be played and presented by the media client. The secondary media multicast stream may be streamed from a same provider service (e.g., a cable or satellite) provider as the primary media stream, but on a different channel. In some implementations, different channels may be reserved for each of multiple secondary media multicast streams, which may be provided in order to increase the quantity of candidate secondary media items available for selection. For example, a single channel for a single secondary media multicast stream may have enough bandwidth to play 20 fixed-length secondary media items between the start of a primary programming timeslot and the start of a secondary programming timeslot on a primary media stream. But the number of secondary media items available may be multiplied by a factor of n by increasing the number of channels providing a respective secondary media multicast stream by a factor of n. Three channels, for example, may permit 60 fixed-length secondary media items to be made available to the media client in the same time interval between the start of the primary programming timeslot and the start of the secondary programming timeslot.

At stage 504, the media client identifies a timeslot in a secondary media multicast stream in which a selected secondary media item is scheduled to play. In some implementations, the timeslot is identified based on information contained in a response to the media client's secondary media item request. The response, for example, may identify the timeslot and, optionally, which of multiple secondary media multicast streams the selected item is scheduled to play. In other implementations, the response may include a unique identifier for the selected media item. Using the identifier of the selected secondary media item, the media client may independently determine the timeslot and channel (stream) that the item is scheduled to play on, e.g., based on information encoded in the multicast media stream.

At stage 506, the media client identifies when the selected secondary media item begins playing on the secondary media multicast stream and records a copy of the selected secondary media item. The copy of the selected secondary media item is stored in a memory of the media client, e.g., in a cache that can be quickly accessed when the time arrives to play the secondary media item during a secondary programming timeslot in the primary media stream. In some implementations, the media client can continue the process from stage 312 of FIG. 3.

FIG. 6 is a conceptual timing diagram of a pair of media clients 602a, 602b that access a secondary media multicast stream 604 to obtain secondary media items to play during an upcoming secondary programming timeslot.

At time $t_1$, primary programming timeslots begin in primary media streams currently being played on the first media client 602a and the second media client 602b. The media clients 602a, 602b each identify the starts of the primary programming timeslots and initiate requests for secondary media items to play during upcoming secondary programming timeslots. The secondary media selection system receives the requests and selects a respective secondary media item for each of the media clients 602a, 602b. The media clients 602a, 602b receive a response to the requests at time $t_2$.

Meanwhile, on a separate secondary media multicast stream 602, a series of candidate secondary media items 606 are played. The candidate secondary items 606 provide different options for media clients to play in a secondary programming timeslot. In some implementations, the secondary media multicast stream 602 is provided on a hidden channel, e.g., a television channel that is not normally accessible for subscribers of a primary media providing service to view directly. Nonetheless, a tuner in the media client may tune to the channel to access the hidden stream while the primary stream continues to be played and presented to users of the media clients. In some implementations, to increase the number of candidate secondary media items available for selection, multiple secondary media multicast streams may be established, e.g., on different channels of a television service, where each stream plays a different set of candidate secondary media items. In some implementations, to further increase the number of candidate secondary media items available for selection, the secondary media items 606 may be compressed to stream more items in a given length of time than would otherwise be possible. For example, by reducing the bitrate of video items by a factor of two, twice as many videos may be streamed on a channel in a given length of time. Thus, a 480p video may be transmitted over a channel that provides bandwidth for 1080p video at four-times the bitrate required to play the 480p video in real-time. The 480p video can then be transmitted over the 1080p channel at four times the normal playback speed (i.e., the video may be played at an accelerated speed on the 1080p channel. When the video is later played during a secondary programming timeslot, the video may be played at the normal playback speed. In some implementations, the channel bandwidth for the secondary media multicast stream may be increased relative to the bandwidth of channels for other streams (e.g., relative to a primary media stream playing on the media client) in order to increase the volume of secondary media items that can be streamed over the channel in a given time interval.

A media service provider that manages the secondary media multicast stream may determine a set of secondary media items, and an order of the items, to play on the secondary media multicast channel. For example, the media service provider may determine which secondary media items in a catalog are most popular for a population of media clients. The most popular subset of the items in the catalog may be played on the channel, and among the played items, they may be played in order of descending popularity during a primary programming timeslot. In this way, the first candidate secondary media item that is most popular is most likely to have completed playing before a secondary programming timeslot begins on a primary media stream. If a media client is unable to obtain a secondary media item that was selected for an upcoming secondary programming timeslot before that timeslot begins, then the media client may play a different secondary media item or instead play the default media item on the primary media stream. This scenario is less likely to occur for secondary items that are played earlier in a primary programming timeslot, and therefore the more popular secondary media items may be played on the multicast channel before the less popular secondary media items.

The first media client 602a may be instructed to play the secondary media item in the second timeslot, labeled 'B', of the secondary media multicast stream 604. Accordingly, the first media client 602a records and stores the item from timeslot 'B' at time $t_3$. The second media client 602b, in contrast, may be instructed play the secondary media item in the third timeslot, labeled 'C', of the secondary media multicast stream 604. Accordingly, the second media client 602b records and stores the item from timeslot 'C' at time $t_4$. Thus, different media clients may use the same secondary media multicast stream 604 to fetch different secondary media items from in the lead-up to a secondary programming timeslot. Moreover, because the media clients 602a, 602b do not wait to retrieve the secondary media items until after detecting insertion signal, the additional time afforded between the start of the primary programming timeslot and the start of the secondary programming timeslot permits a greater number of candidate items to be played on the secondary media multicast stream 604, thereby affording more selection options.

At time $t_5$, the media clients 602a, 602b detect the insertion signal indicating an impending start of a secondary programming timeslot. Finally, at time $t_6$, the media clients 602a, 602b each insert the respective secondary media items selected for the client into the secondary programming timeslot and plays the secondary media items for the duration of the secondary programming timeslot until playback of the primary media streams resume at time $t_7$.

Figure 7:
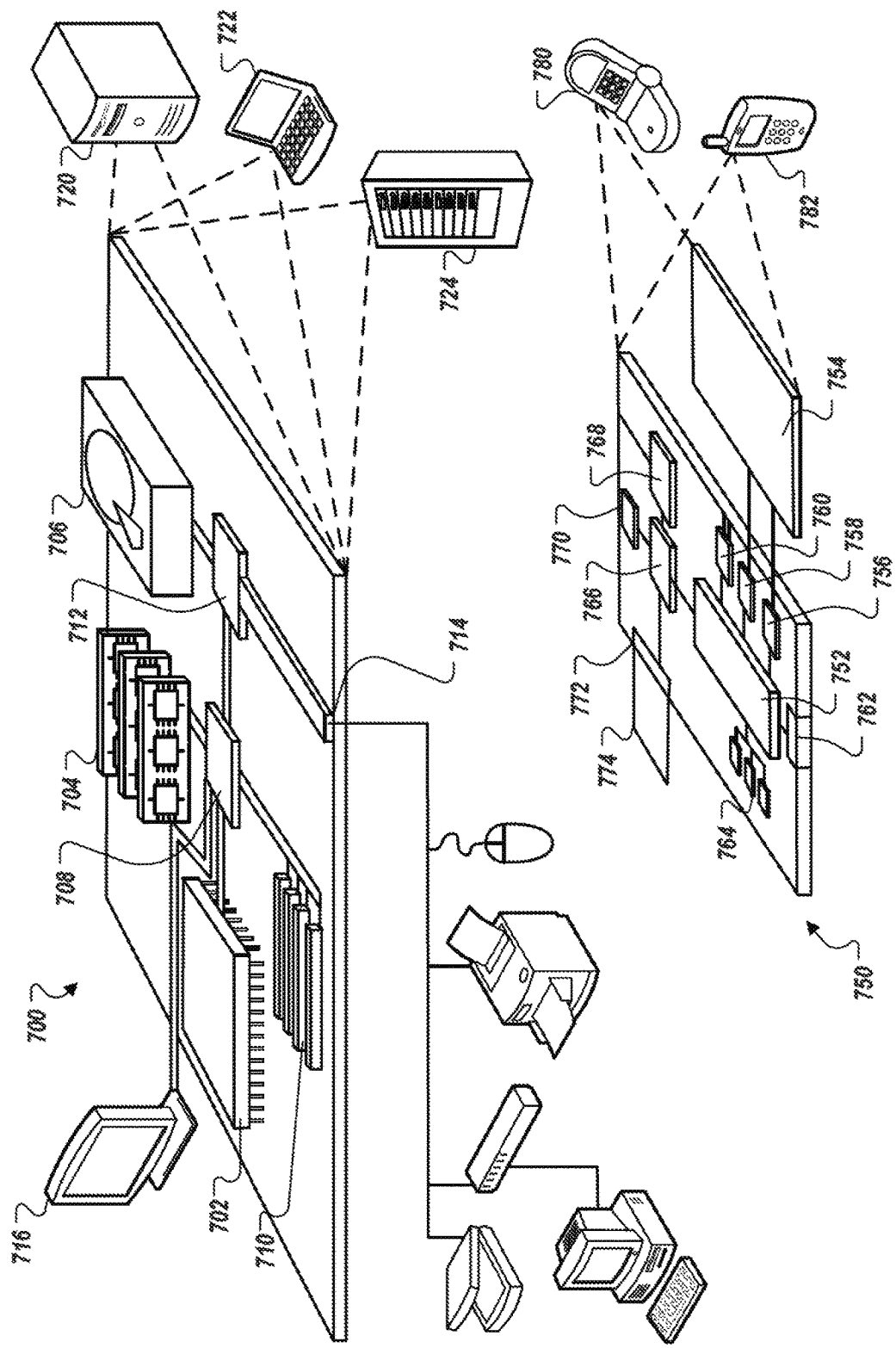
FIG. 7 shows an example of a computing device and a mobile computing device that can be used to implement techniques described herein.

FIG. 7 shows an example of a computing device 700 and a mobile computing device that can be used to implement the techniques described herein. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document. In some implementations, the device 700 and/or the mobile computing device may represent a media client, e.g., media client 102 or 200, or components of a media client.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
playing, by a first media client, a primary media stream that is multicast to a plurality of media clients including the first media client and other media clients;
obtaining, by the first media client, indications of predicted locations in the primary media stream where (i) secondary programming timeslots will interrupt playback of the primary media stream or (ii) insertion signals will occur that indicate corresponding secondary programming timeslots are about to interrupt playback of the primary media stream;
scheduling, by the first media client, retrieval times for retrieving a set of secondary media items to play during a set of secondary programming timeslots that are upcoming in the primary media stream, wherein the first media client schedules the retrieval times based on the predicted locations in the primary media stream where (i) secondary programming timeslots will interrupt playback of the primary media stream or (ii) insertion signals will occur that indicate corresponding secondary programming timeslots are about to interrupt playback of the primary media stream;
retrieving, by the first media client, the set of secondary media items according to the scheduled retrieval times; and
for each secondary programming timeslot in the set of secondary programming timeslots, playing a corresponding secondary media item from the retrieved set of secondary media items in place of the primary media stream during the secondary programming timeslot.

2. The computer-implemented method of claim 1, wherein:
the predicted locations in the primary media stream indicate where secondary programming timeslots will interrupt playback of the primary media stream, and
the first media client schedules the retrieval times for retrieving the set of secondary media items based on the predicted locations in the primary media stream where secondary programming timeslots will interrupt playback of the primary media stream.

3. The computer-implemented method of claim 2, wherein obtaining the indications of predicted locations in the primary media stream where secondary programming timeslots will interrupt playback of the primary media stream comprises obtaining an indication of a predicted frequency with which secondary programming timeslots will interrupt playback of the primary media stream.

4. The computer-implemented method of claim 1, wherein:
the predicted locations in the primary media stream indicate where insertion signals will occur that indicate corresponding secondary programming timeslots are about to interrupt playback of the primary media stream, and
the first media client schedules the retrieval times for retrieving the set of secondary media items based on the predicted locations in the primary stream where insertion signals will occur that indicate corresponding secondary programming timeslots are about to interrupt playback of the primary media stream.

5. The computer-implemented method of claim 4, wherein obtaining the indications of predicted locations in the primary media stream where insertion signals will occur comprises obtaining an indication of a predicted frequency with which insertion signals will occur in the primary media stream.

6. The computer-implemented method of claim 1, wherein scheduling the retrieval times for retrieving the set of secondary media items to play during the set of secondary programming timeslots that are upcoming in the primary media stream comprises scheduling a first retrieval time for retrieving a first secondary media item from the set of secondary media items before an insertion signal occurs that indicates a first secondary programming timeslot is about to interrupt playback of the primary media stream for which the first secondary media item is to be played.

7. The computer-implemented method of claim 1, wherein:
the first media client is a television client that is configured to receive a plurality of multicast video streams over a plurality of channels, and
the primary media stream is one of the plurality of multicast video streams.

8. The computer-implemented method of claim 7, wherein the television client is further configured to receive the plurality of multicast video streams from a cable operator or a satellite operator.

9. The computer-implemented method of claim 1, further comprising determining the predicted locations in the primary media stream based on an identity of the primary media stream being played.

10. The computer-implemented method of claim 1, further comprising determining the predicted locations in the primary media stream based on an identifier of a network or a channel on which the primary media stream is being played.

11. The computer-implemented method of claim 1, further comprising determining the predicted locations in the primary media stream based on at least one of a current time of day or a current day of the week.

12. The computer-implemented method of claim 1, further comprising determining the predicted locations in the primary media stream based on a type of the primary media stream being played.

13. The computer-implemented method of claim 1, further comprising determining the predicted locations in the primary media stream based on a length of the primary media item being played.

14. The computer-implemented method of claim 1, further comprising training a model to predict locations in primary media streams where secondary programming timeslots or insertion signals will occur, wherein the training includes analyzing historical locations in primary media streams where secondary programming timeslots or insertion signals occurred and corresponding conditions of those occurrences.

15. A system, comprising:
one or more processing devices; and
one or more computer-readable media having instructions stored thereon that, when executed by the one or more processing devices, cause performance of operations comprising:
- playing, by a first media client, a primary media stream that is multicast to a plurality of media clients including the first media client and other media clients;
- obtaining, by the first media client, indications of predicted locations in the primary media stream where (i) secondary programming timeslots will interrupt playback of the primary media stream or (ii) insertion signals will occur that indicate corresponding secondary programming timeslots are about to interrupt playback of the primary media stream;
- scheduling, by the first media client, retrieval times for retrieving a set of secondary media items to play during a set of secondary programming timeslots that are upcoming in the primary media stream, wherein the first media client schedules the retrieval times based on the predicted locations in the primary media stream where (i) secondary programming timeslots will interrupt playback of the primary media stream or (ii) insertion signals will occur that indicate corresponding secondary programming timeslots are about to interrupt playback of the primary media stream;
- retrieving, by the first media client, the set of secondary media items according to the scheduled retrieval times; and
- for each secondary programming timeslot in the set of secondary programming timeslots, playing a corresponding secondary media item from the retrieved set of secondary media items in place of the primary media stream during the secondary programming timeslot.

16. The computer-implemented method of claim 15, wherein:
the predicted locations in the primary media stream indicate where secondary programming timeslots will interrupt playback of the primary media stream, and
the first media client schedules the retrieval times for retrieving the set of secondary media items based on the predicted locations in the primary media stream where secondary programming timeslots will interrupt playback of the primary media stream.

17. The computer-implemented method of claim 16, wherein obtaining the indications of predicted locations in the primary media stream where secondary programming timeslots will interrupt playback of the primary media stream comprises obtaining an indication of a predicted frequency with which secondary programming timeslots will interrupt playback of the primary media stream.

18. The computer-implemented method of claim 15, wherein:
the predicted locations in the primary media stream indicate where insertion signals will occur that indicate corresponding secondary programming timeslots are about to interrupt playback of the primary media stream, and
the first media client schedules the retrieval times for retrieving the set of secondary media items based on the predicted locations in the primary stream where insertion signals will occur that indicate corresponding secondary programming timeslots are about to interrupt playback of the primary media stream.

19. The computer-implemented method of claim 18, wherein obtaining the indications of predicted locations in the primary media stream where insertion signals will occur comprises obtaining an indication of a predicted frequency with which insertion signals will occur in the primary media stream.

20. One or more non-transitory computer-readable media having instructions stored thereon that, when executed by one or more processors, cause performance of operations comprising:
- playing, by a first media client, a primary media stream that is multicast to a plurality of media clients including the first media client and other media clients;
- obtaining, by the first media client, indications of predicted locations in the primary media stream where (i) secondary programming timeslots will interrupt playback of the primary media stream or (ii) insertion signals will occur that indicate corresponding secondary programming timeslots are about to interrupt playback of the primary media stream;
- scheduling, by the first media client, retrieval times for retrieving a set of secondary media items to play during a set of secondary programming timeslots that are upcoming in the primary media stream, wherein the first media client schedules the retrieval times based on the predicted locations in the primary media stream where (i) secondary programming timeslots will interrupt playback of the primary media stream or (ii) insertion signals will occur that indicate corresponding secondary programming timeslots are about to interrupt playback of the primary media stream;
- retrieving, by the first media client, the set of secondary media items according to the scheduled retrieval times; and
- for each secondary programming timeslot in the set of secondary programming timeslots, playing a corresponding secondary media item from the retrieved set of secondary media items in place of the primary media stream during the secondary programming timeslot.

* * * * *